(12) United States Patent
Knapke et al.

(10) Patent No.: US 11,428,303 B2
(45) Date of Patent: Aug. 30, 2022

(54) INTER-AXLE DIFFERENTIAL AND METHOD FOR OPERATION OF SAID INTER-AXLE DIFFERENTIAL

(71) Applicant: Dana Heavy Vehicle Systems Group, LLC, Maumee, OH (US)

(72) Inventors: Brian Knapke, Maumee, OH (US); Patrick F. Rose, Hilliard, OH (US); Benjamin J. Passino, Maumee, OH (US); Daniel D. Carmean, Swanton, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/349,707

(22) Filed: Jun. 16, 2021

(65) Prior Publication Data
US 2022/0090666 A1   Mar. 24, 2022

Related U.S. Application Data

(63) Continuation of application No. 17/028,642, filed on Sep. 22, 2020, now Pat. No. 11,098,793.

(51) Int. Cl.
| | |
|---|---|
| *F16H 48/22* | (2006.01) |
| *F16H 48/34* | (2012.01) |
| *B60K 17/35* | (2006.01) |
| *B60K 17/16* | (2006.01) |
| *B60K 17/356* | (2006.01) |
| *B60K 17/12* | (2006.01) |
| *B60K 17/02* | (2006.01) |
| *F16H 48/08* | (2006.01) |
| *F16H 48/20* | (2012.01) |

(52) U.S. Cl.
CPC .............. *F16H 48/22* (2013.01); *B60K 17/02* (2013.01); *B60K 17/12* (2013.01); *B60K 17/16* (2013.01); *B60K 17/35* (2013.01); *B60K 17/356* (2013.01); *F16H 48/34* (2013.01); *F16H 48/08* (2013.01); *F16H 2048/204* (2013.01)

(58) Field of Classification Search
CPC ......... F16H 48/22; F16H 48/34; B60K 17/02; B60K 17/12; B60K 17/16; B60K 17/35; B60K 17/356
See application file for complete search history.

(56) References Cited

U.S. PATENT DOCUMENTS

| | | |
|---|---|---|
| 4,950,214 A | 8/1990 | Botterill |
| 5,279,401 A | 1/1994 | Stall |
| 10,228,049 B2 | 3/2019 | Peura et al. |

(Continued)

FOREIGN PATENT DOCUMENTS

EP   3575120 A1   12/2019

*Primary Examiner* — Tinh Dang
(74) *Attorney, Agent, or Firm* — McCoy Russell LLP

(57) ABSTRACT

Methods and systems for a locking mechanism in an inter-axle differential are provided. A vehicle system, in one example, includes an electric motor coupled to a clutch assembly in a locking mechanism of an inter-axle differential coupled to a first axle and a second axle, the clutch assembly is configured to selectively disengage the locking mechanism, and in the disengaged configuration the locking mechanism permits speed differentiation between the first and second axles. The system further includes an electric motor brake coupled to the electric motor and configured to selectively apply a brake torque to the electric motor and the electric motor is configured to actuate the clutch assembly.

20 Claims, 5 Drawing Sheets

(56) References Cited

U.S. PATENT DOCUMENTS

| | | |
|---|---|---|
| 2014/0251083 A1 | 9/2014 | Suzuki et al. |
| 2015/0192198 A1 | 7/2015 | Suzuki |
| 2016/0131240 A1 | 5/2016 | Cooper |
| 2017/0356535 A1 | 12/2017 | Peura et al. |
| 2020/0047614 A1 | 2/2020 | Bruhn et al. |

INTER-AXLE DIFFERENTIAL AND METHOD FOR OPERATION OF SAID INTER-AXLE DIFFERENTIAL

CROSS-REFERENCE TO RELATED APPLICATION

The present application is a continuation of U.S. patent application Ser. No. 17/028,642, entitled "INTER-AXLE DIFFERENTIAL AND METHOD FOR OPERATION OF SAID INTER-AXLE DIFFERENTIAL," and filed on Sep. 22, 2020. The entire contents of the above-listed application are hereby incorporated by reference for all purposes.

TECHNICAL FIELD

The present disclosure generally relates to a system with an inter-axle differential with a locking mechanism and a method for operation of the inter-axle differential.

BACKGROUND AND SUMMARY

Some vehicle transmissions have employed inter-axle differentials (IADs) which may allow speed differentiation between multiple axles, such as tandem rear axles. Locking mechanisms may be used in certain IADs to prevent speed differentiation between the axles and increase vehicle traction during selected conditions. Some of the locking mechanisms have made use of dog clutches with constrained windows of operation. For instance, periods during which the IAD may perform locking and unlocking may be constrained by vehicle speed. Certain IADs may demand that the vehicle remain stationary or travel at a relatively low speed to perform locking and unlocking procedures in the IAD. Consequently, the vehicle operator may lock the IAD when they anticipate a reduction in vehicle traction. The IAD may remain unlocked in certain situations, such as when traction drops unexpectedly or the vehicle operator overlooks indicators of reduced traction conditions, for instance. Furthermore, the back-driving torque experienced at the IAD may be larger than back-driving torque experienced by downstream axle differentials. The relatively large back-driving torque at the IAD may increase component loading, in some cases.

To overcome at least some of the aforementioned challenges a vehicle system is provided. The vehicle system, in one example, includes an electric motor coupled to a clutch assembly in a locking mechanism of an inter-axle differential (IAD) coupled to a first axle and a second axle. In the system, the clutch assembly is configured to selectively disengage the locking mechanism. In a disengaged configuration, the locking mechanism permits speed differentiation between the first and second axles. The system further includes an electric motor brake coupled to the electric motor and configured to selectively apply a brake torque to the electric motor. The electric motor is configured to actuate the clutch assembly. In this way, a compact actuator can provide actuation functionality for a friction clutch that may engage over a wider range of vehicle operating conditions. For instance, engagement or disengagement of the friction clutch may take place based on operating conditions such as vehicle traction. Consequently, the IAD achieves active locking and unlocking functionality that may unfold while the vehicle is in motion, if desired. By incorporating the brake into the IAD, the chance of unwanted electric motor back-driving may be significantly reduced (e.g., substantially eliminated, in some scenarios). Thus, holding the motor's output torque at a relatively high value to counteract back-driving can be avoided, if wanted, which increases system efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-5 are drawn approximately to scale. However, other relative dimensions may be used, if desired.

DETAILED DESCRIPTION

Vehicle drivetrain system embodiments are described herein. The drivetrain system includes an inter-axle differential (IAD) that may be designed with active locking functionality. The IAD may therefore include a locking mechanism actuated by an electric motor. To engage the locking mechanism, the electric motor may drive a clutch assembly, which may couple a gear in the clutch to an input shaft in the differential. After the clutch is engaged, a motor brake may be operated to sustain the IAD in the locked configuration and prevent motor back-driving. The motor brake may be attached to a housing of the IAD and reacted by the housing. Specifically, in one example, the electric motor may axially extend away from a yoke or other input interface of the IAD. The relative position of the motor with regard to the IAD's input enables the IAD to form a compact arrangement. The IAD may therefore present fewer vehicle packaging challenges and provide greater adaptability with regard to vehicle design and manufacture, if wanted.

Figure 1:
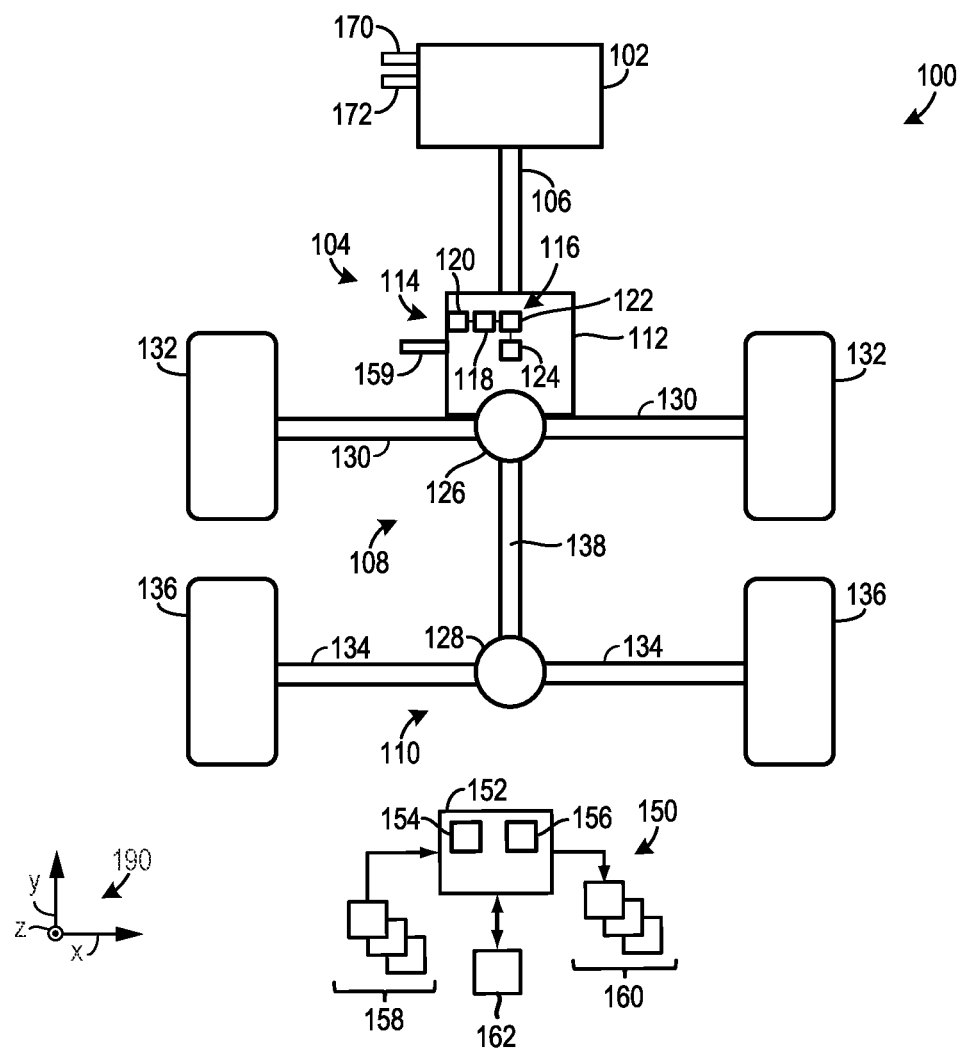
FIG. 1 shows a schematic representation of a vehicle system including an inter-axle differential (IAD) coupled to multiple drive axles.
Figure 2:
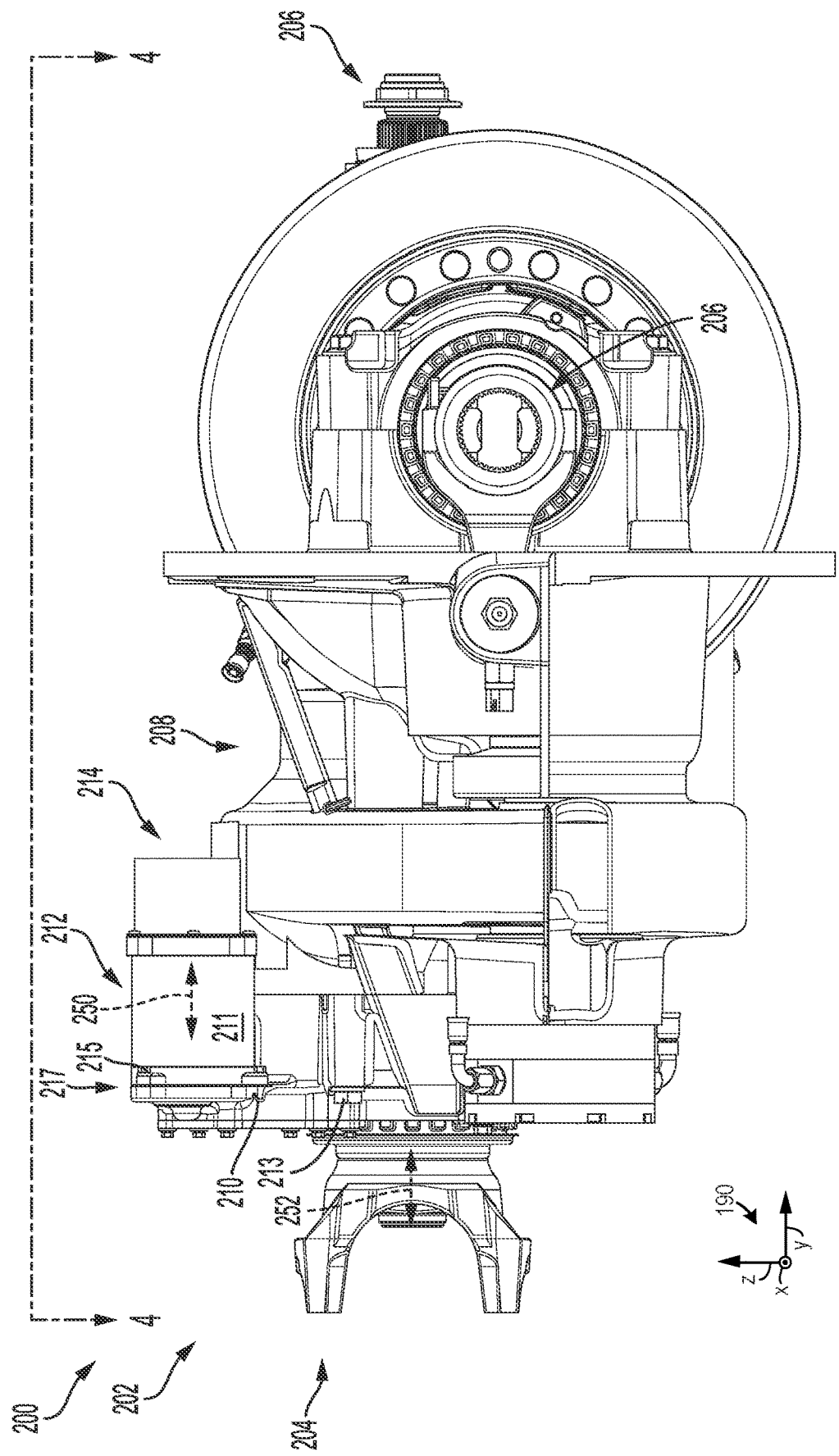
FIG. 2 shows a side view of an embodiment of vehicle system with an IAD.
Figure 3:
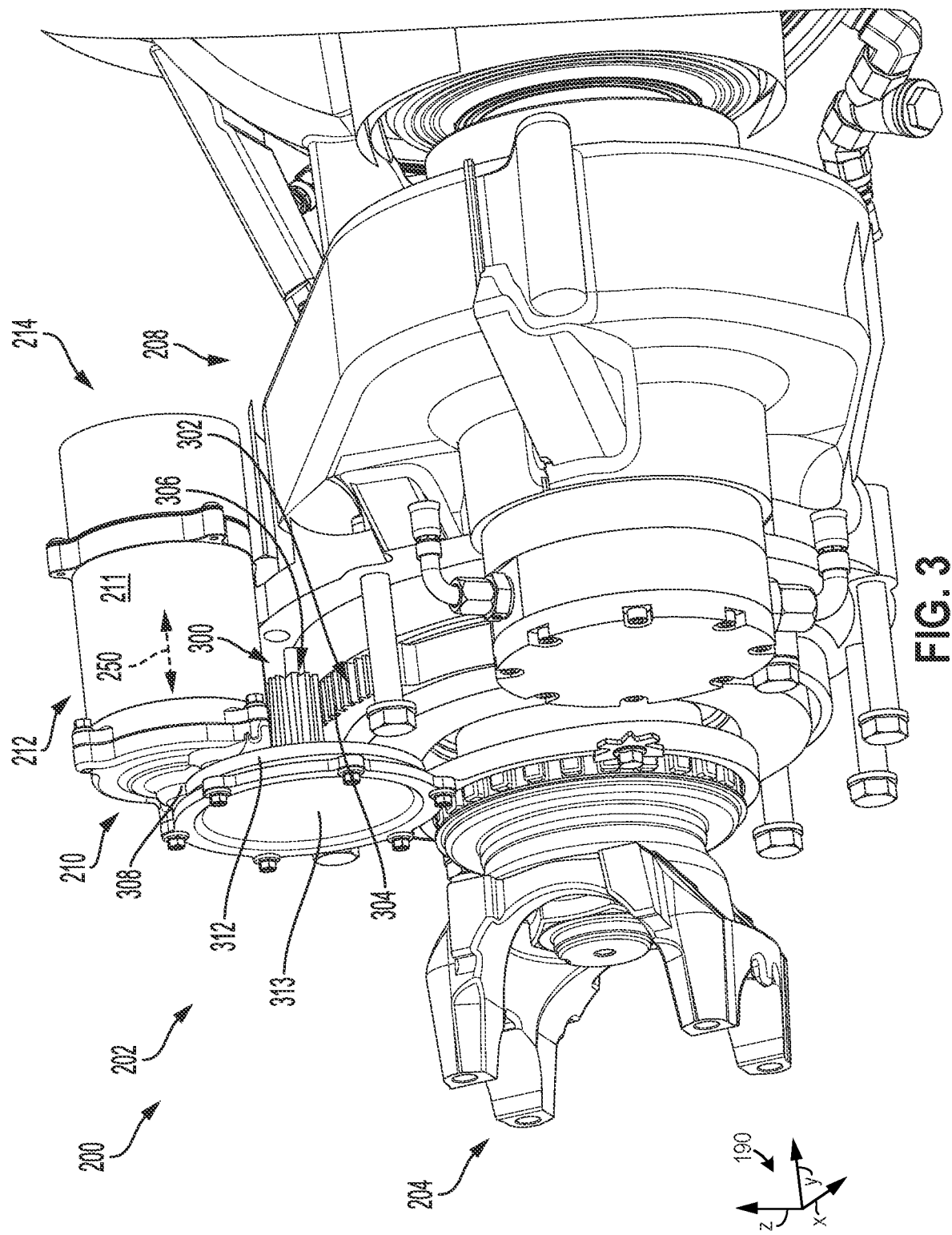
FIG. 3 shows a perspective view of the vehicle system with the IAD, illustrated in FIG. 2.
Figure 4:
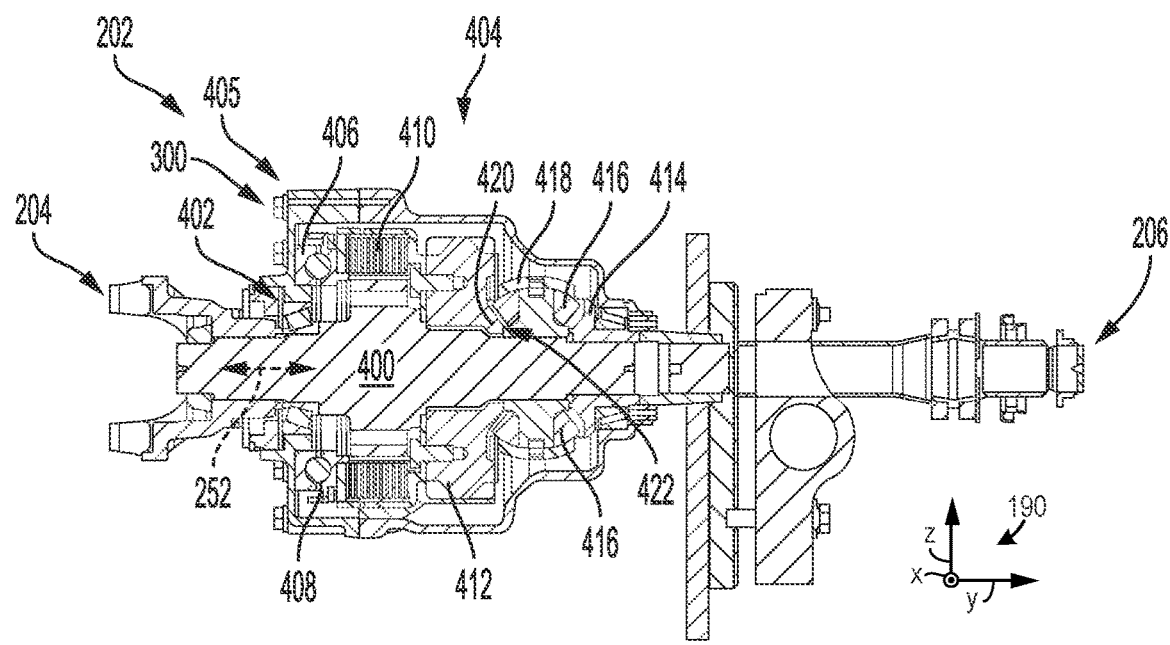
FIG. 4 shows an exploded view of the vehicle system with the IAD, illustrated in FIG. 2.
Figure 5:
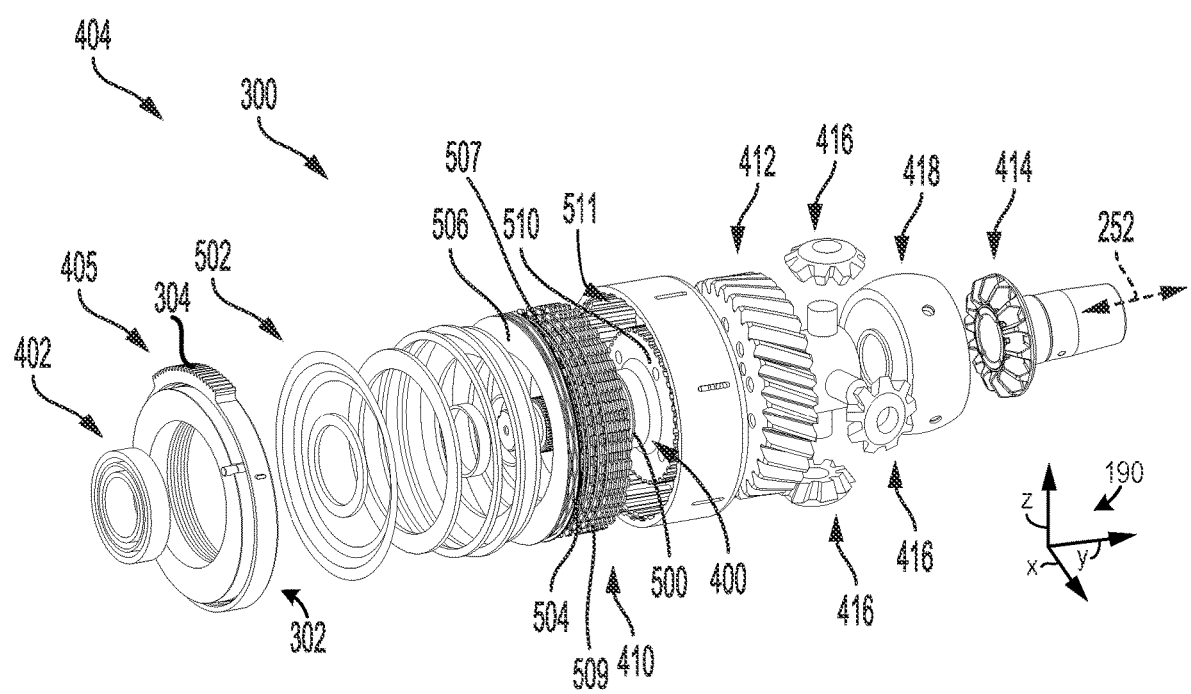
FIG. 5 shows a cross-sectional view of the vehicle system with the IAD, illustrated in FIG. 2.
Figure 6:
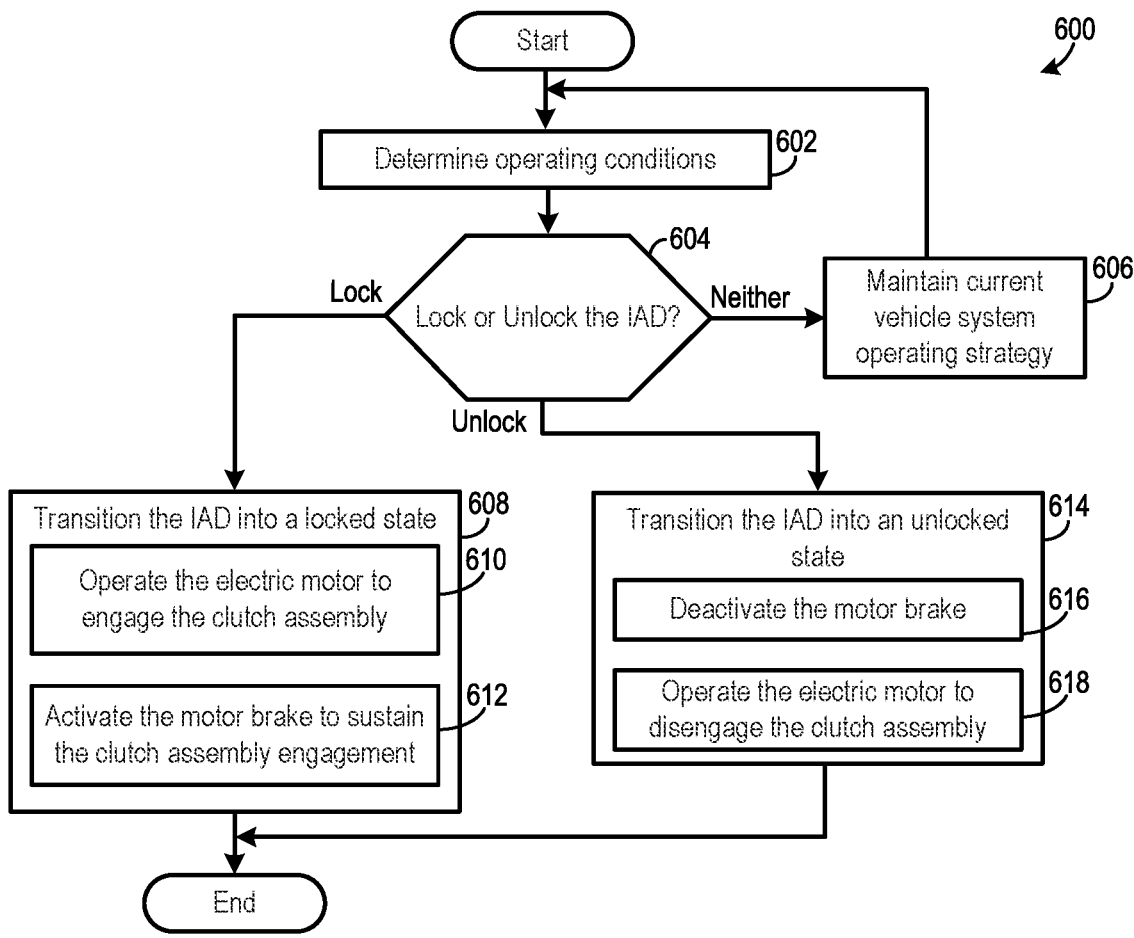
FIG. 6 shows a method for operation of a vehicle system including an IAD.

With regard to the drawings, FIG. 1 schematically depicts a vehicle including an IAD with active locking and unlocking functionality. FIGS. 2-3 illustrate an embodiment of an IAD with a motor and motor brake designed to space efficiently engage and disengage the IAD's locking feature. FIGS. 4 and 5 show cross-sectional and exploded views of the locking mechanism with a clutch assembly configured to actively lock and unlock the IAD. FIG. 6 shows a method for operation of an IAD to efficiently initiate and sustain locking engagement and disengagement, if so desired.

FIG. 1 shows a schematic diagram of a vehicle 100. The vehicle 100 may comprise a drive device 102 which may generate rotational output such as an internal combustion and/or an electric motor. The internal combustion engine may include conventional components such as cylinder(s), piston(s), valves, a fuel delivery system, an intake system, an exhaust system, etc. and the electric motor may include conventional components such as a rotor, stator, housing, and the like. The vehicle may take a variety of forms such as a light, medium, or heavy duty vehicle. Furthermore, hybrid and battery electric vehicles have been envisioned. In other examples, the vehicle may solely use an internal combustion engine for motive power generation.

The diagram of FIG. 1 provides a higher-level topology of the vehicle, drivetrain, and corresponding components. Nevertheless, the vehicle, drivetrain, and corresponding components may have greater structural complexity than is captured in FIG. 1. The structural details of various facets of a vehicle system with an IAD are described in greater detail herein with regard to FIGS. 2-5.

The drive device 102 may couple to a vehicle system 104 via a shaft 106 or other suitable mechanical components. The vehicle system 104 may be designed to transfer torque to drive wheels in a first axle 108 and a second axle 110. The system may make use of mechanical components such as shaft, gears, bearing, and the like to accomplish the aforementioned torque transfer functionality. The vehicle system 104 includes an IAD 112. The IAD 112 includes several components such as a locking mechanism 114 that may comprise an actuation system 116. The actuation system 116 may include an electric motor 118, an electric motor brake 120, a clutch actuator 122, and a clutch assembly 124 (e.g., a friction clutch).

The electric motor 118 may generate a rotational output to induce engagement and disengagement of the locking mechanism 114, during selected periods. To elaborate, the electric motor 118 may drive operation of the clutch actuator 122. In turn, the clutch actuator 122 may be configured to engage and disengage the clutch assembly 124. The system may utilize a variety of components such as ball ramps, gears, plates, etc. in the clutch actuator for engagement-disengagement operation. The clutch assembly 124, when engaged, may prevent speed differentiation between outputs provided to the first and second axles 108, 110. Conversely, when the clutch assembly 124 is disengaged, the system may allow for speed differentiation between the first and second axles 108, 110. It will be appreciated that speed differentiation allows the rotational speeds of the axles 108, 110 to vary in relation to one another, during certain conditions. More generally, when the locking mechanism 114 operates in an engaged configuration, the system inhibits speed differentiation between the first and second axles 108, 110. In this way, vehicle traction may be increased when the vehicle is operating in low traction environments (e.g., wet, snowy, and/or muddy roads), for example. To elaborate, when the locking mechanism inhibits speed differentiation between the axles, the chance of the traction of the first and second axles dropping below a desired value is reduced, when compared to vehicles with only locking axle differentials.

The electric motor 118 may include a rotor, a stator, an output shaft, a housing, and the like to generate rotational output. The electric motor brake 120 may rotationally couple to the electric motor 118 and modulate brake torque used to slow or prevent rotation of the motor's output shaft. Further, the motor brake 120 may be arranged on an axial side of the motor 118 opposite the motor's output shaft, to reduce the likelihood of the brake spatially interfering with upstream propulsion system components. The electric motor brake 120 may be an electromagnetic brake or an eddy current brake electromagnetically applying brake torque to the electric motor. Thus, the brake may include discs, magnets, etc. to modulate electric motor speed. In such an example, the brake may be electrically actuated. In another example, the motor brake 120 may be a friction brake which may be electrically, hydraulically, or pneumatically actuated. The motor brake may be activated during selected periods to hold the locking mechanism 114 in an engaged configuration, for example. In this way, the likelihood of back-driving of the electric motor 118 may be reduced. Thus, motor back-driving may be avoided in certain cases, which may increase motor longevity.

The IAD 112 may couple to the first and second axles 108, 110. The axle coupling may be accomplished via shafts and/or gears, for instance. Thus, the IAD 112 may include a first rotational output (e.g., drive shaft coupled one of the axle differential) and a second rotational output (e.g., a gear coupled a carrier of the other axle differential). Unlocking and locking the IAD may therefore permit and inhibit speed differentiation between these two rotational outputs.

The first and second axles 108, 110, in turn may include a first and a second axle differential 126, 128, respectively. The first and second axle differentials 126, 128 may enable speed differentiation between drive wheels of the corresponding axle under certain conditions. In some implementations, the axle differentials may be locking differentials configured to inhibit and permit wheel speed differentiation at different times. However, a variety of suitable types of axle differential may be deployed in the vehicle. The first and second axles 108, 110 may be in a tandem axle arrangement spaced away from non-driving steerable axle (e.g., non-driving front axle). In another example, the first axle 108 may be a front axle and the second axle 110 may be a rear axle.

The first axle 108 may include axle shafts 130 coupled to drive wheels 132. The second axle 110 likewise may include axle shafts 134 and drive wheels 136. The vehicle system 104 may include a shaft 138 which extends between the IAD 112 and the second axle 110.

The vehicle 100 may include a control system 150 with a controller 152. The controller 152 may comprise a processor 154 and memory 156. The memory 156 may hold instructions stored therein that when executed by the processor cause the controller to perform the various methods, control techniques, etc., described herein. The processor 154 may include a microprocessor unit and/or other types of circuits. The memory 156 may include data storage mediums such as random access memory, read only memory, keep alive memory, combinations thereof, etc. Furthermore, the memory 156 may include non-transitory memory.

The controller 152 may receive various signals from sensors 158 in the vehicle 100 and the vehicle system 104. The sensors may include a vehicle speed sensor 170, a vehicle load sensor 172, an IAD sensor 159, and the like. The controller 152 may send control signals to various actuators 160 coupled at different locations in the vehicle 100 and vehicle system 104. For instance, the controller may send signals to the IAD 112 to lock and unlock the IAD to inhibit and permit speed differentiation between the first and second axles 108, 110. The IAD may lock and unlock responsive to driver input, in one example. For instance, the vehicle 100 may include an input device 162 (e.g., button, switch, touch interface, touch panel, keyboard, combinations thereof, etc.). The input device 162 may generate an IAD lock or unlock request in response to driver input. Thus, a vehicle operator may manipulate the input device 162 to initiate IAD locking and unlocking operation. Additionally or alternatively, the IAD may automatically lock and unlock using an automated strategy. Entry condition parameters for IAD locking and unlocking may include vehicle speed, wheel traction, ambient weather conditions (e.g., ambient temperature, humidity, etc.), and/or combinations thereof. The other controllable components in the vehicle system may function in a similar manner with regard to command signals and actuator adjustment.

An axis system 190 is provided in FIG. 1 as well as FIGS. 2-5, for reference. The z-axis may be a vertical axis, the x-axis may be a lateral axis, and/or the y-axis may be a longitudinal axis, in one example. However, the axes may have other orientations, in other examples.

FIG. 2 illustrates a vehicle system 200 with an IAD 202. The vehicle system 200 and IAD 202, shown in FIG. 2, may serve as an example of the vehicle system 104 and IAD 112, depicted in FIG. 1. The vehicle system 200 may include an input interface 204. The input interface 204 is illustrated as a yoke in FIG. 2. However, other suitable types of mechanical components may operate as an input for the IAD, in other embodiments. For instance, the IAD may include a splined shaft, a gear, a drive chain, and the like for power input. The IAD may further include output interfaces 206 configured to provide torque to axles, such as the first and second axles 108, 110 shown in FIG. 1. To elaborate, one of the output interfaces 206 may be coupled to drive shaft transferring power to a first axle differential and the other output interface may be coupled a second axle differential attached (e.g., directly attached) to the IAD. However, the IAD may deploy other suitable types of output interfaces in alternate embodiments, such as a gear, a belt, a chain, and the like. The IAD 202 may include a housing 208 that may enclose a locking mechanism 404, shown in FIGS. 4 and 5, as well as other components such as shafts and gears which transfer torque between the input interface 204 from the output interfaces 206. The housing 208 may include a section 210 at least partially enclosing gears coupled to a clutch actuator, described in greater detail herein. The IAD housing section 210 may removably couple to a motor housing body 211 via bolts 213 or other suitable attachment devices. In this way, personnel may efficiently access actuator gearing during servicing and repair, for example. The housing section 210 may include a flange 217 which may be oriented in a plane substantially perpendicular to the rotational axis 250. When the motor's housing body 211 is coupled to a flange in this arrangement, motor torque may be efficiently reacted by the IAD housing.

The IAD 202 may further include an electric motor 212. The electric motor 212 may couple to the housing section 210 via bolts 215 or other suitable devices. The electric motor 212 may serve as an actuator for a clutch assembly in a locking mechanism, described in greater detail herein. Thus, rotation of the motor's output shaft in opposite rotational directions may initiate locking and unlocking operation in the IAD. An electric motor brake 214 may couple to the electric motor 212 and is designed to selectively apply brake torque to the electric motor. The brake may be formed as an electromagnetic brake with components such as coils, permanent magnets, etc., or may be a friction brake as previously discussed. Engagement of the brake 214 may occur while the differential remains locked. In this way, the chance of motor back-driving may be significantly reduced while differential locking persists.

FIG. 2 indicates a rotational axis 250 of the electric motor 212 and motor brake 214 is along with a rotational axis 252 of the input interface 204. The rotational axes 250, 252 are further indicated in FIGS. 3-5, when appropriate, for reference. The electric motor 212 and motor brake 214 both axially extend away from the input interface 204 (e.g., the yoke) to achieve a compact arrangement. Electric motor 212 and motor brake 214 may be arranged vertically above and/or laterally offset from the input interface 204. The relative arrangement between the input interface and the electric motor may further increase the IAD's packaging efficiency. Thus, IAD may achieve a space efficient form which may create fewer packaging challenges in the vehicle's design process. The IAD's applicability may therefore be expanded, due to the IAD's space efficient form. Other vehicle systems such as a suspension system may be less space constrained due to the IAD's space efficient profile.

The electric motor 212 and the motor brake 214 may receive commands from a controller, such as the controller 152 shown in FIG. 1. Thus, the control schemes discussed in greater detail herein may be deployed in the IAD 202 shown in FIG. 2.

FIG. 3 shows a perspective view of the vehicle system 200 with the IAD 202. FIG. 3 again illustrates the electric motor 212, the motor brake 214, the IAD housing 208, and the input interface 204.

FIG. 3 further depicts a clutch assembly 300 which may be included in the IAD 202. The clutch assembly 300 may comprise an actuator ring 302 with teeth 304. The clutch assembly 300 may include a spur gear 306, which forms a mesh with the actuator ring 302. As depicted, the spur gear 306 acts as an intermediary between an output shaft 308 of the electric motor 212 and the clutch assembly 300. In this way, a compact gear arrangement may reside between the motor 212 and the clutch assembly 300. Specifically, in one example, the spur gear may be the sole gear between the motor's output and the actuator ring. The motor's housing may be more space efficiently coupled to the IAD housing and reacted there through due to the compact gear arrangement. The spur gear 306 axially extends towards the body 211 of the motor 212, which creates further gains in packaging efficiency. An actuation plate 312 of the spur gear 306 may serve as a motor attachment interface. The actuation plate 312 may extend below the teeth 304 of the actuator ring 302 to further increase IAD space efficiency. A cover plate 313 attached to the IAD housing section 210 may also be included in the IAD, in one example. The cover plate 313 may serve to partially enclose the actuation assembly and may provide a rotational attachment point for the actuation plate 312 and/or spur gear 306.

FIG. 4 shows a cross-sectional view of the IAD 202. The input interface 204 coupled to an input shaft 400 is depicted in FIG. 4. A bearing 402 may couple to the input shaft 400. The bearing supports and enables rotation of the shaft. The bearing 402 is depicted as a thrust roller bearing, which reacts axial and radial loads. However, other suitable types of bearings may be used such as a ball bearing, in other embodiments.

FIG. 4 depicts the clutch assembly 300 in the IAD 202. The clutch assembly 300 may be included in a locking mechanism 404 which may be configured to engage and disengage locking in the IAD 202. The clutch assembly 300 may comprise a ball ramp actuator 405 with an actuation plate 406 coupled to the actuator ring 302, shown in FIG. 3. Thus, when the motor rotates the actuator ring, the actuation plate 406 may correspondingly rotate. A ball 408 residing in ramps in the actuation plate 406 may function to axially engage and disengage a disc pack 410 in the clutch assembly 300. The disc pack 410, when engaged, rotationally couples a gear 412 (e.g., a helical gear) to the input shaft 400. The gear 412 may transfer torque to an axle differential (e.g., the axle differential 126, shown in FIG. 1).

The input shaft 400 may further couple to a side gear 414 in the IAD 202. In turn, the side gear 414 meshes with spider gears 416 on a carrier 418. Teeth 420 on an axial side 422 of the gear 412 may form a mesh with the spider gears 416. The aforementioned gear arrangement, permits speed differentiation between two axles (e.g., axles 108, 110, shown in FIG. 1) when the IAD 202 is in an unlocked state. The side gear 414 may rotationally couple to an output shaft 415 with the output interface 206. As previously discussed, the output interface 206 may transfer torque to a second drive axle (e.g., the differential 128 of the axle 110, shown in FIG. 1).

FIG. 5 shows an exploded view of the clutch assembly 300 in the locking mechanism 404. The assembly 300 may include the bearing 402, the ball ramp actuator 405, the disc pack 410, gear 412, spider gears 416, carrier 418, and/or side gear 414. FIG. 5 further illustrates a section 500 of the input shaft 400 and a retainer 502. The ball ramp actuator 405 may be in face sharing contact with the retainer 502. The ball ramp actuator 405, while actuation unfolds, moves axially in a direction along axis 252 responsive to input from the motor 212, shown in FIG. 3.

Continuing with FIG. 5, the axial movement of the ball ramp actuator 405 may move the retainer 502 which compresses and decompresses a wave spring 504 downstream of the retainer 502. Compression and decompression of the wave spring 504 may cause axial movement of a plate 506. In turn, axial movement of the plate 506 may engage and disengage clutch discs 507 and plates 509 in the disc pack 410. To elaborate, external teeth of the clutch plates 509 may spline to a component 511. Additionally, internal teeth of the clutch discs 507 may spline to the gear 510 coupled to the input shaft section 500. While the clutch assembly 300 remains engaged, the gear 412 and the input shaft 400 may rotate as one unit. Conversely, while the clutch assembly 300 remains disengaged, the gear 412 and the input shaft 400 may rotate relative to each other. Downstream of the input shaft 400 and gear 412, power may flow from the spider gear 416 to the side gear 414.

The IAD described herein enables a compact actuation package to actively lock and unlock speed differentiation in the differential. While the IAD is locked, the motor brake coupled to the actuation motor may reduce or in some cases substantially eliminate motor back-driving, which drives down the likelihood of unwanted motor degradation. The reduction or elimination of motor back-driving may be particularly beneficial in the IAD which may experience higher torque than downstream axle differentials. Further, the IAD may realize increased packaging efficiency due to the off-axis positioning of the motor and brake, if wanted.

FIG. 6 shows a method 600 for operation of an electric drive axle system. One or more of the electric drive axle systems, components, etc., described above with regard to FIGS. 1-5, may implement method 600, in one embodiment. However, other suitable electric drive axle systems may carry out the method, in other embodiments. Furthermore, a controller (e.g., controller 152 shown in FIG. 1) holding instructions stored in non-transitory memory executable by a processor may be used to carry out the steps of method 600.

At 602, the method includes determining operating conditions. The operating conditions may include locking device configuration, input interface configuration, vehicle speed, vehicle load, etc. The operating conditions may be determined based on sensor signals, modeling algorithms, etc.

Next at 604, the method includes determining if a state change of the locking device is desired. The state change of the locking device may include transitioning the locking device from an engaged state to a disengaged state or vice versa. User interaction with an input device which indicates the driver's desire for a state change, may trigger reconfiguration of the IAD locking mechanism. However, the vehicle system may deploy automated strategies for triggering a locking device state change, in other implementations. In one instance, transitioning the IAD from an unlocked state to a locked state may be initiated based on vehicle traction. Vehicle traction may be calculated based on parameters such as wheel speed, vehicle speed, ambient temperature, and the like. Thus, in one use-case implementation, the IAD may lock when vehicle traction falls below a threshold value. It will be appreciated that the IAD may be an active IAD designed to lock while the vehicle is traveling between 0 kilometers per hour (km/h) and 32 km/h, in one use case example. Further, in one example, the IAD locking mechanism may lock and prevent speed differentiation between the axles when a speed between the first and second axles (e.g., tandem forward and rear axles) is equal to or greater than zero. In this way, the window of vehicle operating conditions during which the IAD can be locked may be expanded in comparison to locking devices demanding that the vehicle be stopped or traveling below a comparatively low speed (e.g., 10 km/h) to initiate locking operation.

If it is determined that an IAD locking device state change is not desired (NO at 604) the method moves to 606, where the method includes maintaining the vehicle system's current operating strategy. For example, a locked or unlocked state of the IAD may be sustained to maintain the system's current operating strategy.

Conversely, if the IAD locking device is slated to transition from the disengaged state to the engaged state, the method moves to 608. At 608, the method includes transitioning the IAD into a locked state from an unlocked state. Transitioning the IAD into a lock state includes operating the electric motor to engage the clutch assembly, at 610, and activating the motor brake to sustain the clutch assembly engagement, at 612. Further in one example, the motor may be de-energized once the motor brake is activated. In this way, IAD locking may actively unfold and the electric motor brake operation may maintain the IAD in the locked state to reduce the likelihood of motor back-driving. Consequently, the chance of motor degradation is decreased.

If the IAD locking device is slated to transition from the engaged state to the disengaged state, the method moves to 614. At 614, the method includes transitioning the IAD into the unlocked state from the locked state. This modal transition includes at 616, deactivating the motor brake and at 618, operating the electric motor to disengage the clutch assembly. Method 600 allows the IAD to efficiently sustain locking operation using the brake device and reduce or eliminate the chance of motor back-driving. The vehicle system may achieve a robust arrangement that may be less susceptible to higher back-driving torque experienced by the IAD, in relation to the back-driving torque experienced by axle differentials, for instance.

The technical effect of the vehicle system with the IAD and the method for operation of the system described herein is to reduce the chance of electric motor back-driving while the IAD is locked, which decreases the chance of motor degradation. The IAD system described herein may have a compact arrangement which increases the IAD's applicability. The IAD system may therefore be used in a wider variety of vehicle platforms, if so desired.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a vehicle system is provided that comprises an electric motor coupled to a clutch assembly in a locking mechanism of an inter-axle differential, wherein the inter-axle differential is coupled to a first axle and a second axle and the clutch assembly is configured to selectively disengage the locking mechanism, and, in the disengaged configuration, the locking mechanism permits speed differentiation between the first and second axles; and an electric motor brake coupled to the electric motor and configured to selectively apply a brake torque to the electric motor, wherein the electric motor is configured to actuate the clutch assembly.

In another aspect, a method for operation of a vehicle system is provided that comprises operating an electric motor coupled to a clutch assembly to engage a locking mechanism in an inter-axle differential, wherein the inter-axle differential is coupled to a first axle and a second axle and engagement of the locking mechanism prevents speed differentiation between the first axle and the second axle; and activating an electric motor brake coupled to the electric motor to apply a brake torque to the electric motor and prevent back-driving of the electric motor. In one example, the method may further comprise deactivating the electric motor brake to release the brake torque; and operating the electric motor to disengage the locking mechanism, wherein disengagement of the locking mechanism enables speed differentiation between the first and second axles.

In yet another aspect, a vehicle system is provided that comprises a vehicle system, comprising: an electric motor coupled to a clutch assembly in a locking mechanism of an inter-axle differential, wherein the inter-axle differential is coupled to a first axle and a second axle, wherein the clutch assembly selectively disengages the locking mechanism, and wherein in a disengaged configuration the locking mechanism allows speed differentiation between the first and second axles; and an electromagnetic motor brake coupled to the electric motor and configured to selectively apply a brake torque to the electric motor, wherein the electric motor is configured to actuate the clutch assembly; wherein the clutch assembly includes a ball ramp actuator configured to selectively engage and disengage a plurality of friction plates; and wherein a portion of the plurality of friction plates are rotationally coupled to a clutch configured to engage and disengage a gear on an input shaft.

In any of the aspects or combinations of the aspects, the clutch assembly may include a ball ramp actuator configured to selectively engage and disengage a plurality of friction plates, wherein a portion of the plurality of friction plates are rotationally coupled to a clutch configured to engage and disengage a gear on an input shaft.

In any of the aspects or combinations of the aspects, the vehicle system may further comprise a spur gear coupled to the electric motor and the ball ramp actuator.

In any of the aspects or combinations of the aspects, the electric motor brake may an electromagnetic brake.

In any of the aspects or combinations of the aspects, the electric motor and the electric motor brake may extend axially away from an input interface.

In any of the aspects or combinations of the aspects, the vehicle system may further comprise a controller including executable instructions stored in non-transitory memory that, when a speed between the first and second axles is equal to or greater than zero, cause the controller to: engage the locking mechanism to prevent speed differentiation between the first axle and the second axle.

In any of the aspects or combinations of the aspects, the locking mechanism may be automatically engaged based on one or more operating conditions.

In any of the aspects or combinations of the aspects, the locking mechanism may be engaged responsive to actuation of an input device.

In any of the aspects or combinations of the aspects, the first and second axles may be rear axles.

In any of the aspects or combinations of the aspects, the clutch assembly may include a ball ramp actuator configured to selectively engage and disengage a plurality of friction plates, wherein a portion of the plurality of friction plates may be rotationally coupled to a clutch configured to engage and disengage a gear on an input shaft.

In any of the aspects or combinations of the aspects, the electric motor and the electric motor brake may be coupled to an inter-axle differential housing and axially extend away from an input yoke.

In any of the aspects or combinations of the aspects, the vehicle system may further comprise a controller including executable instructions stored in non-transitory memory that cause the controller to: engage the locking mechanism to prevent speed differentiation between the first axle and the second axle.

In any of the aspects or combinations of the aspects, the locking mechanism may be automatically engaged based on one or more operating conditions.

In any of the aspects or combinations of the aspects, the locking mechanism may be engaged responsive to actuation of an input device.

In any of the aspects or combinations of the aspects, the vehicle system may further comprise a spur gear coupled to the electric motor and the ball ramp actuator.

In any of the aspects or combinations of the aspects, the spur gear may be directly coupled to the ball ramp actuator.

In another representation, an inter-axle differential (IAD) assembly is provided that includes an electric motor and brake unit triggering locking and unlocking of a friction clutch in a body of the IAD, wherein the brake unit holds a rotational shaft in the electric motor stationary while the IAD operates in a locked configuration to inhibit speed differentiation between a first axle and a second axle and where the first and second axles each include an axle differential.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various drivetrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of control strategies. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated operations, actions, and/or functions may be repeatedly performed depending on the strategy being used. Further, the described operations, actions, and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, engines, and/or drivetrains. The subject matter of the present disclosure includes all novel and non-obvious combinations and sub-combinations of the various systems and configurations, and other features, functions, and/or properties disclosed herein.

As used herein, the term "approximately" and "substantially" are construed to mean plus or minus five percent or less of the range or value unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
an electric motor coupled to a locking mechanism of an inter-axle differential (IAD), wherein the inter-axle differential is configured to couple to a first axle and a second axle and wherein the locking mechanism is configured to selectively disengage, and, in a disengaged configuration, the locking mechanism permits speed differentiation between the first and second axles; and
an electric motor brake coupled to the electric motor and configured to selectively apply a brake torque to the electric motor;
wherein the locking mechanism is coaxial with an input interface of the IAD.

2. The vehicle system of claim 1, wherein a central axis of the electric motor is parallel to a central axis of the locking mechanism.

3. The vehicle system of claim 1, wherein the locking mechanism includes a ball ramp actuator that axially extends and retracts to engage and disengage the locking mechanism.

4. The vehicle system of claim 1, wherein the first and second axles are included in a tandem axle.

5. The vehicle system of claim 1, wherein a first output interface coupled to the second axle is arranged coaxial to the input interface.

6. The vehicle system of claim 5, wherein a second output interface that is coupled to the first axle is arranged perpendicular to the input interface.

7. The vehicle system of claim 1, wherein the electric motor brake is a friction brake.

8. The vehicle system of claim 1, wherein the electric motor brake is an electromagnetic brake that includes coils and/or permanent magnets.

9. The vehicle system of claim 1, wherein the input interface is a yoke.

10. A method for operation of a vehicle system, comprising:
energizing an electric motor to engage a locking mechanism in an inter-axle differential (IAD), wherein the IAD is designed to couple to a first axle and a second axle and engagement of the locking mechanism prevents speed differentiation between the first axle and the second axle;
activating an electric motor brake coupled to the electric motor to apply a brake torque to the electric motor and prevent back-driving of the electric motor; and
de-energizing the electric motor after the electric motor brake is activated.

11. The method of claim 10, further comprising:
deactivating the electric motor brake to release the brake torque.

12. The method of claim 10, wherein the electric motor brake is a friction brake.

13. The method of claim 10, wherein the electric motor brake is an electromagnetic brake.

14. The method of claim 10, wherein the electric motor is energized in response to operator interaction with an input device.

15. The method of claim 10, wherein the electric motor is automatically energized based on vehicle traction.

16. A vehicle system, comprising:
an electric motor coupled to a locking mechanism of an inter-axle differential (IAD), wherein the IAD is configured to couple to a first axle and a second axle and the locking mechanism is configured to selectively disengage, and, in a disengaged configuration, the locking mechanism permits speed differentiation between the first and second axles;
an electric motor brake coupled to the electric motor; and
a controller including executable instructions that when executed cause the controller to:
engage the locking mechanism to prevent speed differentiation between the first axle and the second axle; and
activate the electric motor brake to apply a brake torque to the electric motor and prevent back-driving of the electric motor;
wherein the locking mechanism is coaxial with an input interface of the IAD.

17. The vehicle system of claim 16, wherein the electric motor brake is a friction brake or an electromagnetic brake that includes coils and/or permanent magnets.

18. The vehicle system of claim 16, wherein the controller comprises instructions that when executed cause the controller to:
de-energize the electric motor after the electric motor brake is activated.

19. The vehicle system of claim 16, wherein the locking mechanism is automatically engaged based on vehicle traction.

20. The vehicle system of claim 16, wherein the first and second axles are included in a tandem rear axle assembly.

* * * * *